United States Patent [19]

Kurashima

[11] Patent Number: 5,475,783
[45] Date of Patent: Dec. 12, 1995

[54] OPTICAL MODULE, METHOD OF MANUFACTURING THE SAME, AND SLEEVE

[75] Inventor: Hiromi Kurashima, Yokohama, Japan

[73] Assignee: Sumitomo Electric Industries, Ltd., Osaka, Japan

[21] Appl. No.: 314,652

[22] Filed: Sep. 29, 1994

[30] Foreign Application Priority Data

Sep. 30, 1993 [JP] Japan ................................ 5-245479

[51] Int. Cl.⁶ ............................................. G02B 6/30
[52] U.S. Cl. ................................... 385/92; 385/94
[58] Field of Search ..................... 385/88, 89, 91, 385/92, 93, 94

[56] References Cited

U.S. PATENT DOCUMENTS

| | | | |
|---|---|---|---|
| 4,547,039 | 10/1985 | Caron et al. | 385/92 |
| 5,117,476 | 5/1992 | Yingst et al. | 385/92 |
| 5,222,170 | 6/1993 | Bargar et al. | 385/94 |
| 5,353,364 | 10/1994 | Kurashima | 385/88 |
| 5,361,318 | 11/1994 | Go et al. | 385/92 |
| 5,379,362 | 1/1995 | Kawamura | 385/92 |

FOREIGN PATENT DOCUMENTS 2126107 10/1990 Japan .

*Primary Examiner*—Rodney B. Bovernick
*Assistant Examiner*—Robert E. Wise
*Attorney, Agent, or Firm*—Cushman Darby & Cushman

[57] ABSTRACT

An optical module comprises a plastic package constituted by a package main body and a cover, sleeves formed integrally with the package main body, a circuit board held in the package main body, light-activated elements fixed at predetermined positions of the circuit board, three projections formed integrally with an inner surface of the package main body and brought into contact with a periphery of the circuit board to position the circuit board, springs formed integrally with an inner surface of the package to press the periphery of the circuit board against the projections. Since the sleeve and the package main body are integrally formed by plastic molding, the number of components is reduced, thereby simplifying the assembling steps.

17 Claims, 9 Drawing Sheets

5,475,783

OPTICAL MODULE, METHOD OF MANUFACTURING THE SAME, AND SLEEVE

BACKGROUND OF THE INVENTION

1. Field of the Invention

The present invention relates to an optical module used in an optical communication system such as an optical data link or an optical local area network (LAN), which uses light as an information transmission medium.

2. Related Background Art

As optical modules used in an optical communication system, there are a transmission module using a light-activated element such as an LED or a semiconductor laser as an electrooptic converting element (light-emitting element), and a reception module using a light-activated element such as a pin-photodiode as a photoelectric converting element (light-receiving element). Such an optical module generally has a light-activated element such as a light-emitting element or a light-receiving element, electronic components electrically connected to the light-activated element and arranged on a circuit board, a lens system, and a sleeve in which the end portion of an optical fiber is inserted. For an optical fiber with a fiber core having a diameter of several tens µm, the light-activated element, the lens system, and the sleeve must be assembled at high precision. For this reason, an optical module as shown in FIG. 1 is conventionally used.

The optical module shown in FIG. 1 has a cylindrical holding body 1. The holding body 1 is formed of a metal such as stainless steel. A lens (not shown) is arranged in the holding body 1 at one end. The other end portion of the holding body 1 serves as a sleeve for receiving a ferrule (not shown) at the end portion of an optical fiber. A light-activated element 2 is fixed to the holding body 1 with an adhesive or the like. The light-activated element 2 is arranged such that the optical axes of the element 2, the ferrule connected to the holding body 1 and the lens are matched with each other.

The holding body 1 having the light-activated element 2 fixed therein is supported, together with a circuit board 3, by a package main body 4 consisting of a ceramic or metal. The terminals of the light-activated element 2 are connected by soldering (not shown) to electronic components 5 such as bare chip ICs mounted on the circuit board 3.

The package main body 4 has inner lead pins 6 mounted inside the body 4, and outer lead pins 7 mounted outside the body 4 and electrically connected to the inner lead pins 6. The inner lead pins 6 are electrically connected to terminals on the circuit board 3 by soldering. The wiring pattern and the electronic components 5 are sealed by a lid 8. Finally, a cover 9 is fixed to the package main body 4, thereby completing the optical module.

In the conventional optical module as described above, the light-activated element 2 is held by the holding body 1 formed of a metal cylinder. The holding body 1 is an independent member which separates from the package main body 4 having the circuit board 3 mounted thereon and the cover 9. For this reason, there are many components of the module, resulting in higher productive cost and lower productive efficiency.

Although not illustrated, an optical module is known in which a lead frame is used in place of a package main body and a cover. A circuit board and a light-activated element are mounted in the lead frame, and all these components are integrally molded with a plastic (Japanese Utility Model Laid-Open No. 2-126107). In this case, however, the light-activated element and the circuit board are independent members, as in the optical module shown in FIG. 1. Therefore, the same problem as in FIG. 1 is present.

SUMMARY OF THE INVENTION

Accordingly, it is an object of the present invention to provide an optical module which can be easily and precisely assembled without using a cylindrical metal holding body.

In order to achieve the above object, according to the present invention, the constituent components of an optical module are integrally formed of a plastic. In this case, it is important to check whether a light-activated element such as a light-emitting element or a light-receiving element, a lens, and a sleeve can be precisely arranged by plastic molding.

The present inventor made an examination based on FIG. 2 and found that a precision required to couple light with a quartz optical fiber (graded-index type, core diameter: 62.5 µm) could be ±15 µm in a plane perpendicular to the optical axis and ±50 µm in a direction parallel to the optical axis. It was confirmed that, with this precision, the optical module could be realized with the dimensional precision of the plastic molding.

FIG. 2 is a graph showing a relationship between a deviation in optical axis and an optical power wherein the quartz optical fiber and the light-activated element are separated from each other by a predetermined interval. This graph was obtained in the following manner. Two lenses were arranged between an end of the optical fiber and the light-activated element. The lens far from the end face of the optical fiber was defined as the first lens, and the lens closer to the end face of the optical fiber was defined as the second lens. The first lens was fixed, and the second lens was stationary with respect to the optical axis. In this state, the second lens was moved in the plane perpendicular to the optical axis, and variations in optical power of light coupled to the optical fiber were checked. Referring to FIG. 2, L1 represents an interval between the first lens and the second lens, and L2 represents an interval between the second lens and the optical fiber. FIG. 2 shows variations in power of light in five arrangements obtained upon changing the position of the second lens along the optical axis. As described above, the present inventor found, from graphs indicated by symbols Δ and ◊, that a dimensional precision of ±15 µm was allowed in the plane perpendicular to the optical axis, and a dimensional precision of ±50 µm was allowed in the direction parallel to the optical axis. The present invention has been made on the basis of this examination.

According to the present invention, there is provided an optical module comprising a plastic package, constituted by a package main body and a cover for closing an open portion of the package main body, for receiving and holding a connector plug connected to an optical fiber, a sleeve formed integrally with the package main body by plastic molding to receive an end portion of the optical fiber when the connector plug is held in the package main body, a circuit board held in the open portion of the package main body, a light-activated element fixed at a predetermined position of the circuit board, three projections formed integrally with an inner surface of the package main body and brought into contact with a periphery of the circuit board to position the circuit board, spring means formed integrally with an inner surface of the package to press the periphery of the circuit board against the projections, and a condenser lens coaxially arranged in the sleeve.

In the optical module having the above arrangement, since the sleeve and the package main body are integrally formed by plastic molding, the number of components is reduced, thereby simplifying the assembling steps. The circuit board is always supported by the projections at the predetermined reference points. Therefore, when the light-activated element is arranged at the predetermined position with respect to the reference points, the light-activated element, the sleeve, and the lens are coaxially arranged.

According to the present invention, there is also provided a method of manufacturing an optical module having the above arrangement, comprising the steps of preparing a board supporting table having three positioning pins standing on a surface in substantially the same layout as that of the three projections, resting the circuit board on the surface of the board supporting table, pressing the circuit board such that the periphery of the circuit board is brought into contact with all the pins, and using contact points of the pins as reference points to fix the light-activated element at a predetermined position with respect to the reference points.

When the light-activated element is to be arranged on the circuit board, the positions where the circuit board is brought into contact with the projections in the package main body, i.e., the reference points can be easily specified by using the board supporting table having the positioning pins arranged in the same layout as that of the projections. As a result, the light-activated element can be arranged at a position where the light-activated element is aligned with the sleeve and the lens.

The present invention will become more fully understood from the detailed description given hereinbelow and the attached drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

In the course of the following detailed description, reference will be made to the attached drawings in which.

DETAILED DESCRIPTION OF THE PREFERRED EMBODIMENTS

In the following description, like references characters designate like or corresponding parts throughout the several views. Also in the following description, it is to be understood that such terms as "front", "rear", "left", "right", "upper", and the like, are words of convenience and are not to be construed as limiting terms.

Figure 1:
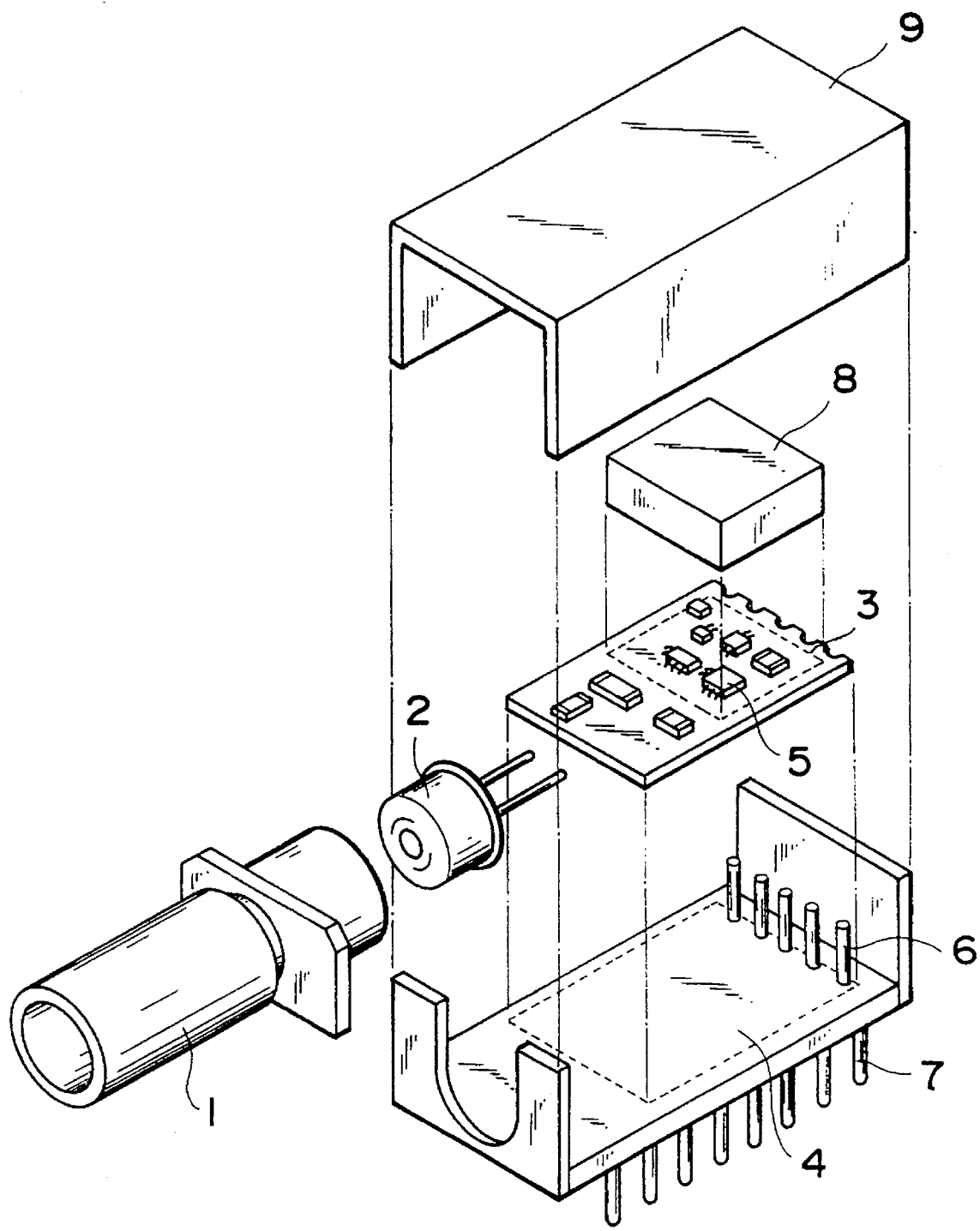
FIG. 1 is an exploded perspective view showing a conventional optical module.
Figure 2:
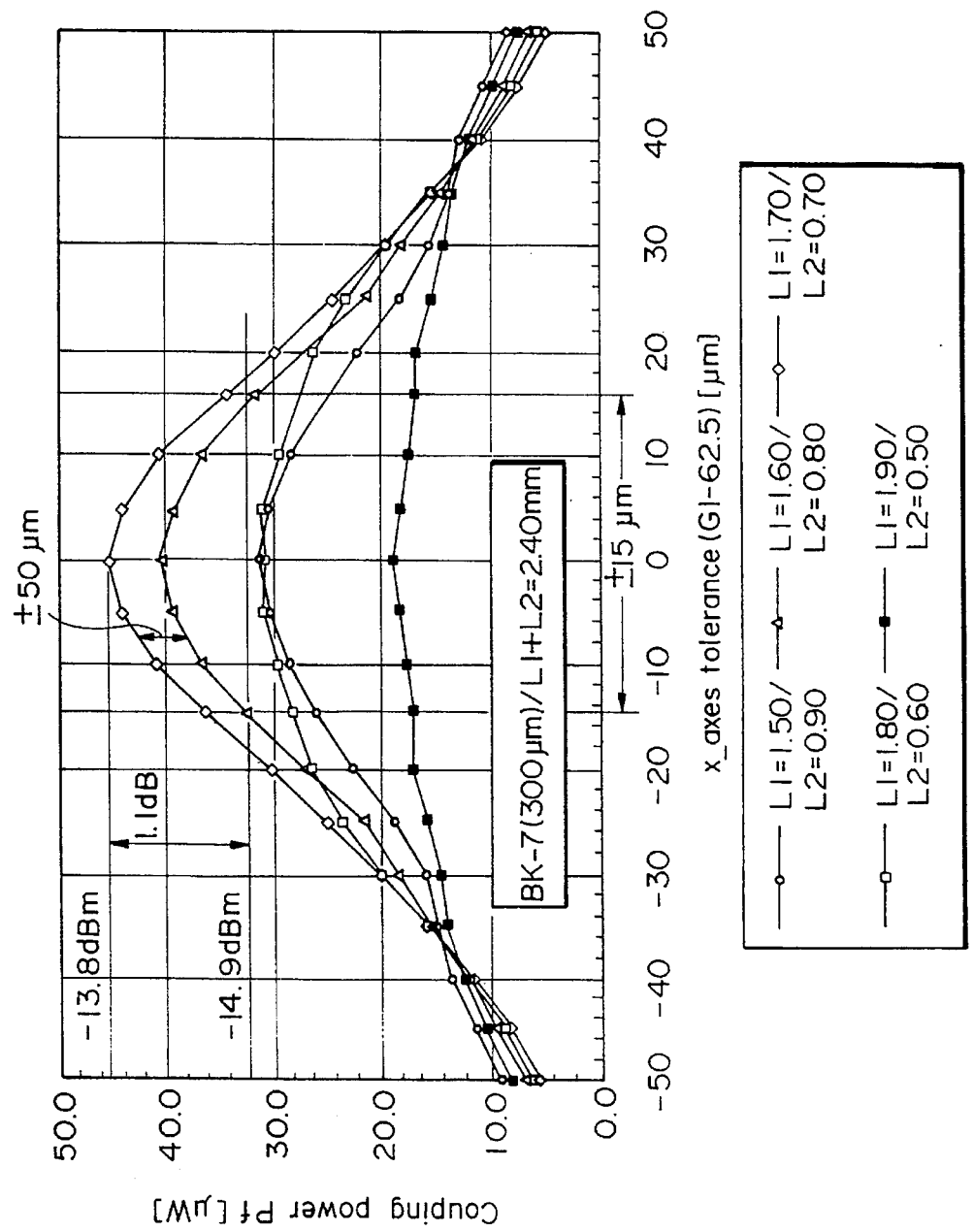
FIG. 2 is a graph showing variations in optical power or coupling power caused by a deviation in optical axis.
Figure 3:
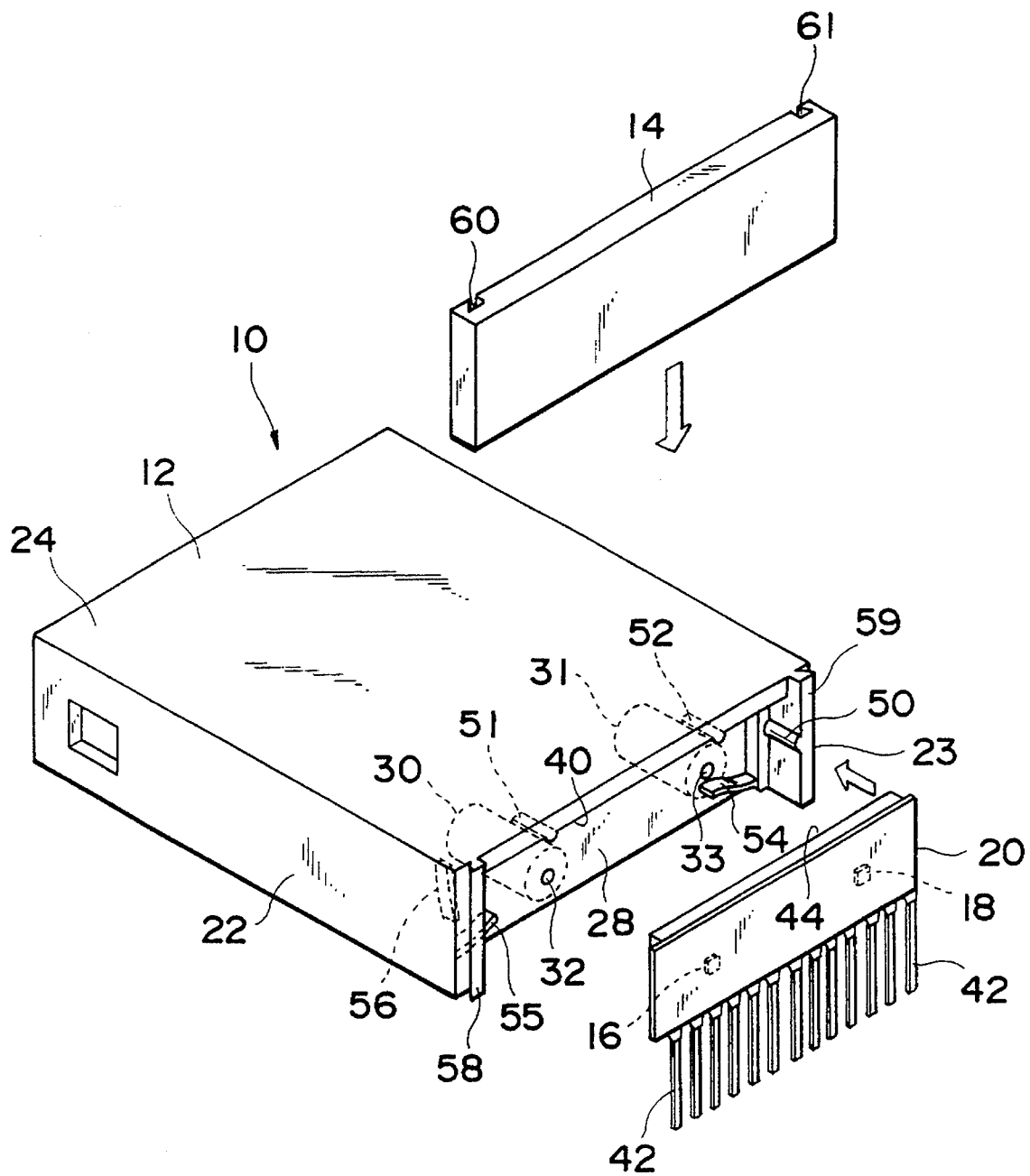
FIG. 3 is an exploded perspective view showing an optical module according to a preferred embodiment of the present invention.
Figure 4:
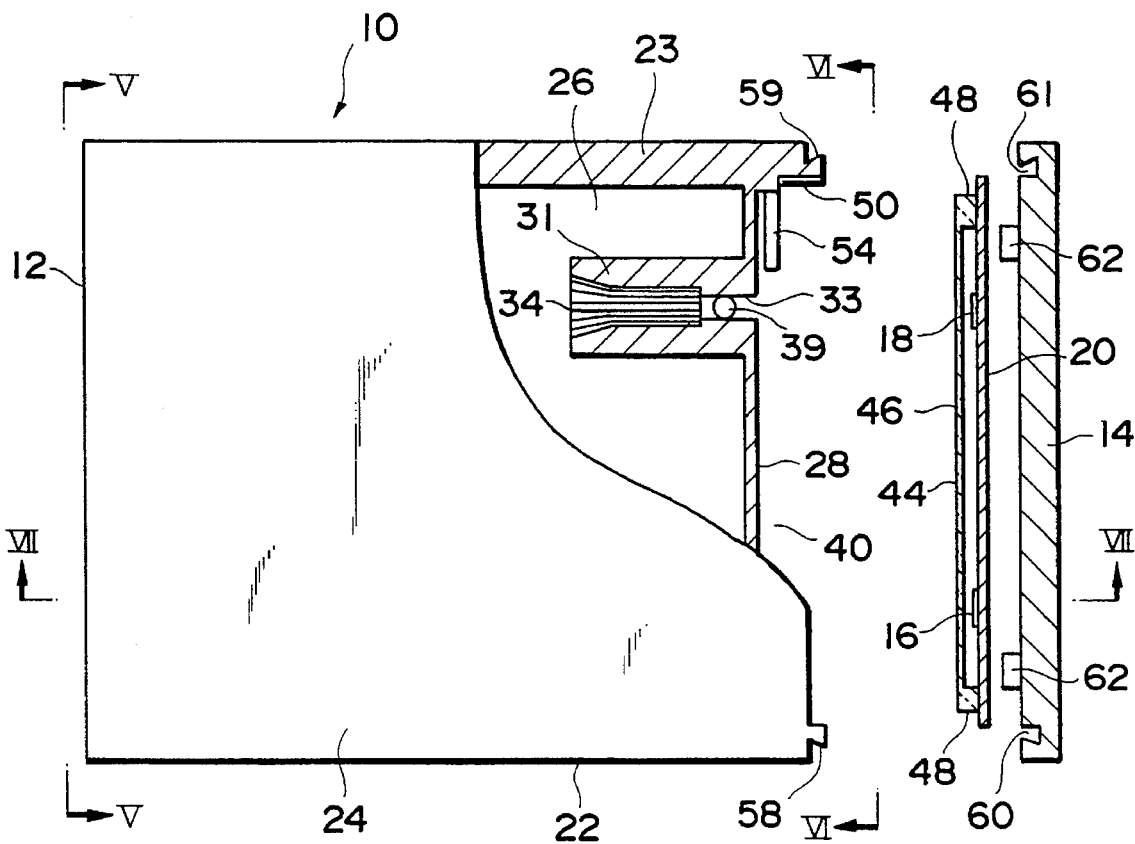
FIG. 4 is a partially cutaway plan view showing the optical module shown in FIG. 3 in a disassembled state.
Figure 5:
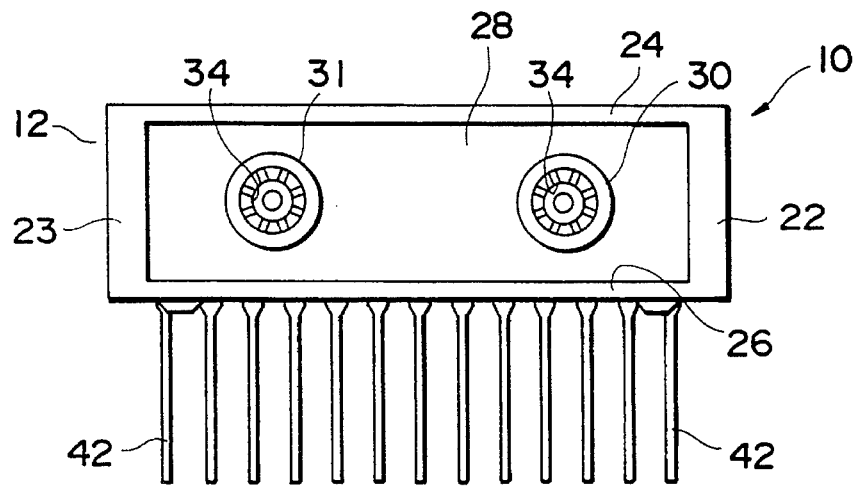
FIG. 5 is a front view showing the optical module taken along a line V—V in FIG. 4.

FIGS. 3 to 7 are views showing an optical module according to an embodiment of the present invention. This optical module is of a transceiver type which integrates a transmission module and a reception module. Referring to FIG. 3, reference numeral 10 designates an entire package formed by plastic molding. The package 10 comprises a package main body 12 and a cover 14 and serves as an optical connector receptacle for receiving connector plugs (not shown) provided at the end portions of transmission and reception optical fibers (not shown) to be connected. A circuit board 20 having ICs (not shown), a light-emitting element 16, a light-receiving element 18, and the like fixed thereon can be mounted in the package 10.

The package main body 12 is of a rectangular prism shape or parallelepiped box shape and has a pair of side plates 22 and 23 arranged parallel to each other, an upper plate 24 and a bottom plate 26. The upper and bottom plates 24 and 26 are arranged between the upper edges and between the lower edges of the side plates 22 and 23, respectively, to be parallel to each other. As is apparent from FIG. 7, the side plates 22 and 23 and the upper plate 24 have almost the same length. The bottom plate 26 is shorter than the side plates 22 and 23 and the upper plate 24. One end of the bottom plate 26 is separated from the corresponding end portions of the side plates 22 and 23 and the upper plate 24 by a predetermined distance. A lateral plate 28 is arranged between the side plates 22 and 23 to perpendicularly extend from the end portion of the bottom plate 26 to the upper plate 24. Therefore, one end portion of the package main body 12 is closed by the lateral plate 28. The other end portion of the package main body 12 is open. The connector plug of the optical fiber is inserted into the open end portion. The open end portion side is conveniently referred to as a front side hereinafter. The side plates 22 and 23, the upper plate 24, the bottom plate 26, and the lateral plate 28 are integrally formed of an appropriate plastic material.

A pair of sleeves 30 and 31 are arranged in the package main body 12 to receive the ferrules (not shown) at the end portions of the optical fibers and align each ferrule with the light-emitting element 16 or the light-receiving element 18 (to be described later). The sleeves 30 and 31 are parallelly arranged in the lateral direction to be separated from each other by a predetermined interval and extend forward (the open end portion side of the package main body 12) from the front surface of the lateral plate 28. The sleeves 30 and 31 consist of the same plastic material as that of the lateral plate 28 and the like and integrally formed on the lateral plate 28. Through holes 32 and 33 are formed in the lateral plate 28 at portions opposing the hollow portions of the sleeves 30 and 31. Together with the hollow portions of the sleeves 30 and 31, the through holes 32 and 33 form continuous holes which communicate the front inner portion to the rear inner portion of the package main body 12.

Figure 8:
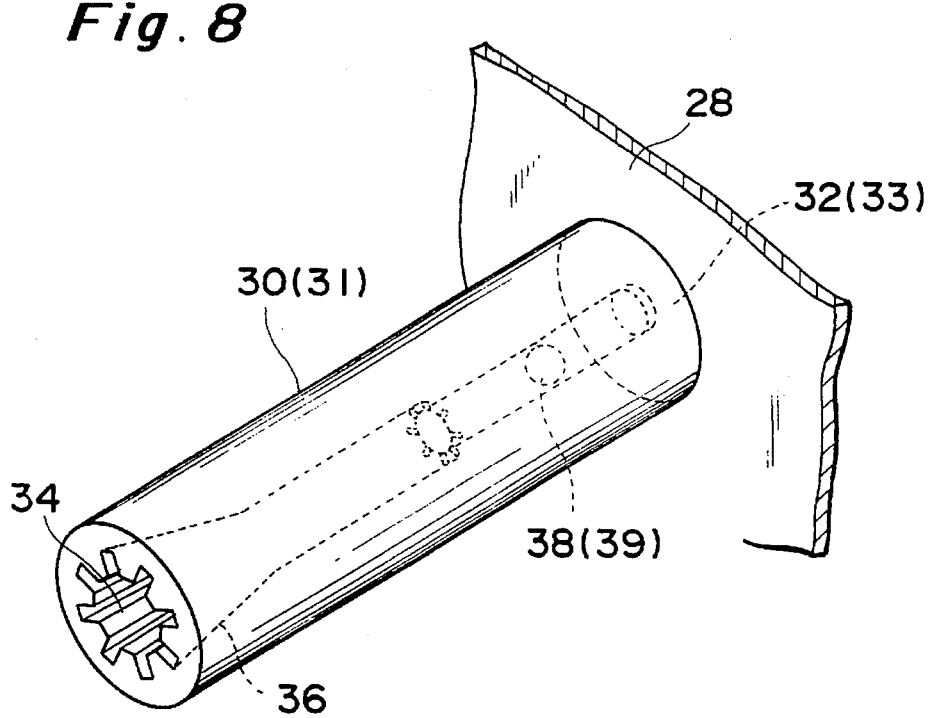
FIG. 8 is an enlarged perspective view showing a sleeve.

When the connector plugs of the optical fibers are inserted into the package main body 12 and held, the ferrules of the optical fibers are inserted into the corresponding sleeves 30 and 31 and supported by the inner surfaces of the sleeves 30 and 31 at desired positions. In the present invention, the sleeves 30 and 31 are not formed of a metal but a plastic, so the inner surfaces of the sleeves 30 and 31, which are in contact with the metal or ceramic ferrules, can be worn upon attachment and detachment of the connector plugs. Particularly, the inner surfaces of the sleeves 30 and 31 must be precisely formed to determine the radial positions of the ferrules. For this reason, friction between the sleeves 30 and 31 and the ferrules is increased. In this embodiment, to prevent or reduce the friction on the inner surfaces of the sleeves 30 and 31, a plurality of grooves 34 extending in the axial direction are formed in the inner surfaces of the sleeves 30 and 31, especially at portions in contact with the ferrule, and circumferentially spaced to each other, as shown in FIG. 8. With this arrangement, the contact area with respect to the ferrule is reduced, slidability is improved, and the wear of the contact surface is reduced. In addition, a tapered portion 36 is preferably provided in the inner surface of the front end portion of the sleeve so that the ferrule can be smoothly inserted into the sleeve 30 or 31.

Lenses 38 and 39 are respectively arranged inside the sleeves 30 and 31, more particularly, at appropriate locations of the portions of the sleeves on which the ferrules do not abut. The lenses 38 and 39 are positioned such that their optical axes match the longitudinal axes of the corresponding sleeves 30 and 31, respectively. The lens 38 mounted in the sleeve 30 opposing the light-emitting element 16 focuses light from the light-emitting element 16 on the central portion of the end face of the corresponding ferrule, i.e., the end face of the fiber core. The lens 39 mounted in the sleeve 31 focuses light emerging from the end face of the reception optical fiber on the light-receiving surface of the light-receiving element 18.

The substantially rectangular circuit board 20 is arranged in a recessed portion (a portion defined by the inner surfaces of the side plates 22 and 23, the inner surface of the upper plate 24, and the rear surface of the lateral plate 28) 40 on the rear end portion side of the package main body 12. The circuit board 20 in this embodiment consists of a ceramic, an epoxy resin, or the like. A wiring pattern (not shown) is formed on the surface of the circuit board 20, and electronic components (not shown) such as ICs are mounted thereon. As shown in FIG. 3, a circuit on the circuit board 20 is electrically connected to an external circuit by a plurality of lead pins 42 extending from the lower edge of the circuit board 20.

In this embodiment, the light-emitting element 16 such as a semiconductor laser or a light-emitting diode and the light-receiving element 18 are mounted on the surface of the circuit board 20 as light-activated elements. The light-emitting element 16 and the light-receiving element 18 are mounted such that the centers of the light-emitting and light-receiving surfaces almost match the central axes of the corresponding sleeves 30 and 31 when the circuit board 20 is arranged at a predetermined position in the package main body 12. As is well known, in order to improve optical coupling efficiency between the light-emitting element 16 and the optical fiber, it is preferable to arrange a microball lens (not shown) at the center of the light-emitting surface of the light-emitting element 16 and fix it with a transparent adhesive or the like. Alternatively, a light-emitting element having a monolithic lens may be used.

A transparent lid 44 of a plastic is fixed on the surface of the circuit board 20 by an adhesive. The wiring pattern, the electronic components, and the light-activated elements 16 and 18 on the surface of the circuit board are shielded from an atmosphere by the lid 44. The transparent lid 44 has a rectangular flat plate portion 46 which is slightly smaller than the circuit board 20, and a peripheral portion 48 formed integrally with the peripheral edges of the flat plate portion 46 and perpendicularly depends therefrom. The end face of the peripheral portion 48 of the transparent lid 44 is bonded to the surface of the circuit board 20. Therefore, a space is formed between the flat plate portion 46 of the transparent lid 44 and the surface of the circuit board 20, and the light-activated elements 16 and 18 and the like are arranged in this space.

Figure 6:
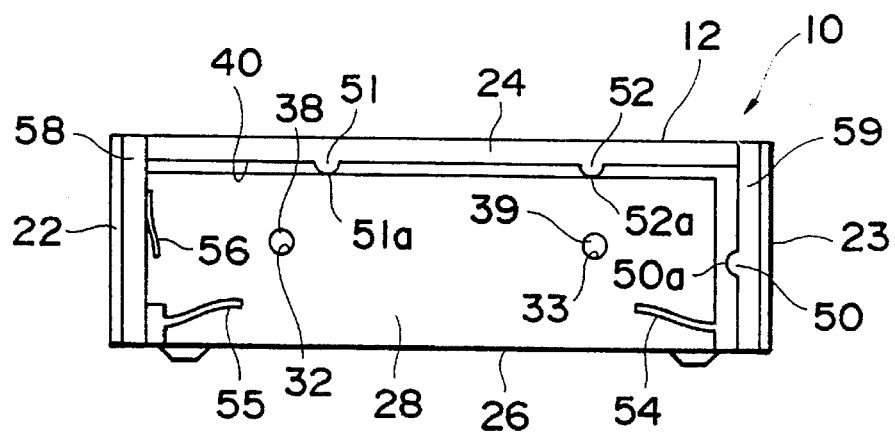
FIG. 6 is a rear view showing the rear surface of a package main body of the optical module taken along a line VI—VI in FIG. 4.
Figure 7:
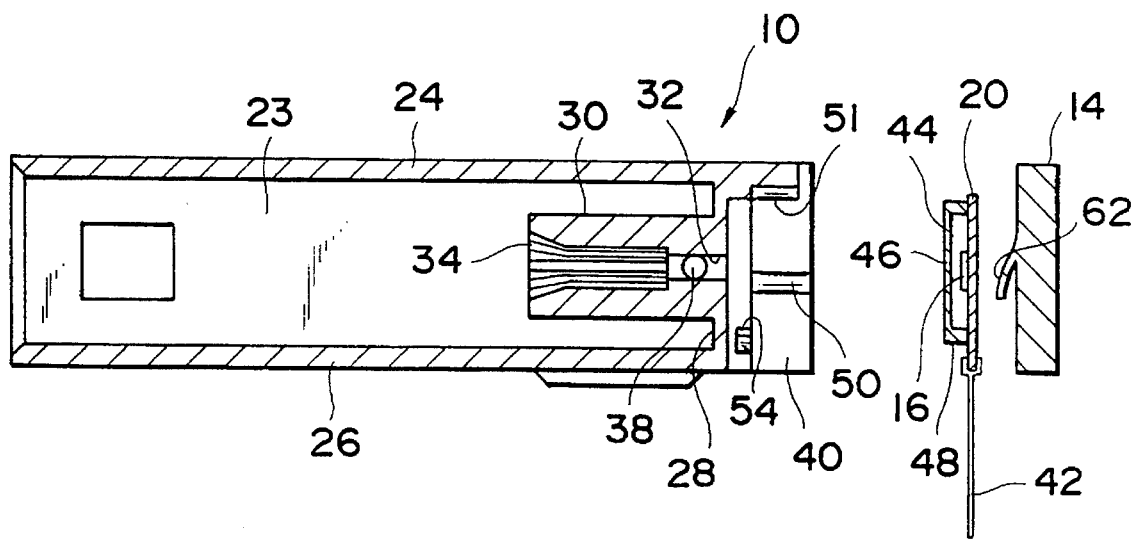
FIG. 7 is a sectional view taken along a line VII—VII in FIG. 4.

As described above, the circuit board 20 is arranged in the recessed portion 40 on the rear end portion side of the package main body 12. The circuit board 20 is accurately positioned by three positioning projections 50 to 52 formed on the inner surface of the package main body 12. As is understood from FIG. 6, one of the projections 50 to 52 is formed on the rear end portion side of the inner surface of the side plate 23, and the remaining projections are arranged in the lateral direction on the rear end portion side of the inner or lower surface of the upper plate 24 to be separated from each other by a predetermined interval. The projections 50 to 52 have a substantially semicircular section and extend along the longitudinal direction of the package main body 12. The circuit board 20 is arranged in a state wherein its periphery is pressed against the projections 50 to 52 and positioned. More specifically, one long side of the rectangular circuit board 20, i.e., the upper edge is brought into contact with the projections 51 and 52 on the upper plate 24 of the package main body 12. At the same time, one short side of the board 20, i.e., the right side edge in FIG. 3 is brought into contact with the projection 50 on the side plate 23. With this arrangement, the circuit board 20 is supported at the three points, and its movements along two axial directions perpendicular to each other and in the rotational direction are limited. Springs 54 to 56 for pressing the circuit board 20 against the projections 50 to 52 are integrally formed on the rear end portion sides of the inner surfaces of the side plates 22 and 23 of the package main body 12. As shown in FIG. 6, the spring 54 for pressing the circuit board 20 upward is formed, at a position adjacent to the lateral plate 28, on the inner surface of the side plate 23 having the projection 50. The spring 55 for pressing the circuit board 20 upward and the spring 56 for pressing the circuit board 20 toward the opposing side plate 23 are provided, at positions adjacent to the lateral plate 28, on the inner surface of the side plate 22. Various shapes of the springs 54 to 56 can be considered. In this embodiment, each of the springs 54 to 56 is an arch-like projecting piece having one end integrally fixed to the side plate 22 or 23. When the circuit board 20 is arranged at a predetermined position to bring the surface of the flat plate portion 46 of the transparent lid 44 into contact with the rear surface of the lateral plate 28, the springs 54 to 56 are brought into contact with the outer surface of the peripheral portion 48 of the transparent lid 44, thereby pressing the transparent lid 44. At this time, the springs 54 to 56 do not directly press the circuit board 20. However, since the transparent lid 44 is fixed to the circuit board 20, the pressing forces of the springs 54 to 56 act on the circuit board 20 through the transparent lid 44, thereby pressing the circuit board 20 against the projections 50 to 52. The circuit board 20 pressed against the projections 50 to 52 by the springs 54 to 56 does not move in a plane defined by the surface of the circuit board 20.

The positions where the projections 50 to 52 are in contact with the circuit board 20 are kept unchanged. For this reason, when the light-emitting element 16 and the light-receiving element 18 are arranged at predetermined positions on the circuit board 20, the predetermined position being previously determined on the basis of the contact points as reference points, the light-emitting element 16 and the light-receiving element 18 are always arranged on the central axes of the corresponding sleeves 30 and 31, respectively, at the time of mounting the circuit board 20.

As described above, the package 10 of the optical module according to the present invention has the cover 14. The cover 14 closes the rear end portion of the package main body 12 to hold the circuit board 20. In this embodiment, the cover 14 can be mounted at the rear end portion of the package main body 12 by dovetail joints. More specifically, dovetail-like projections 58 and 59 formed on the rear end surfaces of the side plates 22 and 23 of the package main body 12 are engaged with dovetail grooves 60 and 61 formed at the corresponding positions on the front surface of the cover 14, thereby jointing the cover 14 and the package main body 12.

At least one (two in this embodiment) spring 62 is integrally formed on the front surface of the cover 14. When the cover 14 is mounted on the package main body 12, the springs 62 press the lower surface of the circuit board 20 forward. As a result, the circuit board 20 is pressed forward, and the front surface of the flat plate portion 46 of the transparent lid 44 is brought into tight contact with the rear surface of the lateral plate 28, thereby arranging the circuit board 20 and the lateral plate 28 almost parallel to each other. With this arrangement, the circuit board 20 is prevented from being separated from the springs 54 to 56 of the side plates 22 and 23, and at the same time, a deviation in optical axis is prevented. The lead pins 42 of the circuit board 20 externally extend from a gap between the cover 14 and the bottom plate 26 of the package main body 12 to enable connection to the external circuit.

As described above, when the optical module of this embodiment is used, the circuit board 20 is accurately positioned with respect to the package main body 12. For this reason, the light-emitting element 16 and the light-receiving element 18 are coaxially arranged with the corresponding sleeves 30 and 31 and the internal lenses 38 and 39, respectively.

As is apparent from the above description, when the circuit board 20 having the light-emitting element 16, the light-receiving element 18, the electronic components, and the transparent lid 44 fixed thereon is arranged at a predetermined position in the package main body 12 and held by the springs 54 to 56, and the cover 14 is mounted, the optical module of the present invention can be easily manufactured. When the dimensional precision of an actually assembled optical module was checked, it was confirmed that the dimensional precision among the sleeves, the lenses, and the light-activated elements was ±15 µm or less in a plane perpendicular to the optical axis and ±50 µm or less in a direction parallel to the optical axis. This falls within a tolerance of the optical coupling efficiency when a quartz fiber (graded-index type, core diameter: 62.5 µm) is coupled to a light-activated element.

In case of the circuit board 20 of a ceramic, it is common that a large ceramic plate is divided along a predetermined line, thereby forming the circuit board 20. Generally, the periphery of the circuit board 20 obtained in this manner is not polished. Therefore, the size of the circuit board 20 varies for each product, and each edge does not form a perfect line.

For this reason, it becomes difficult to accurately mount the light-emitting element 16 and the light-receiving element 18 at predetermined positions on the circuit board 20. If the light-emitting element 16 and the light-receiving element 18 are inaccurately mounted on the circuit board 20, the light-emitting element 16 and the light-receiving element 18 are not aligned with the corresponding sleeves 30 and 31 even if the circuit board 20 is arranged at a predetermined position in the package main body 12, as a matter of course.

Figure 9:
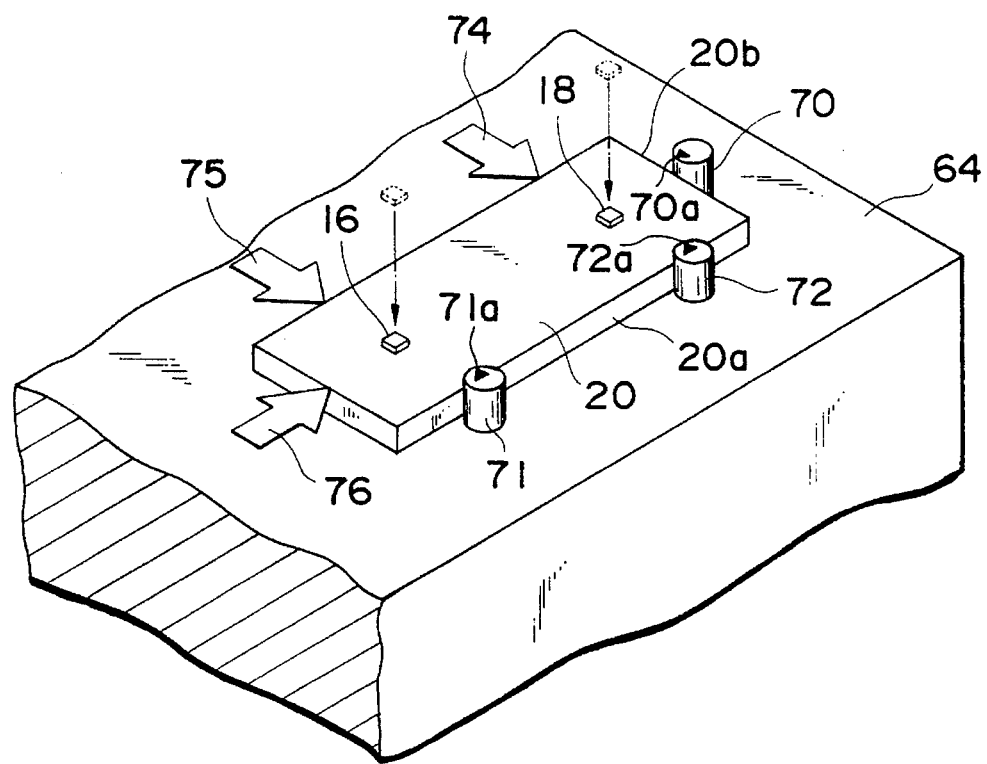
FIG. 9 is a perspective view showing a method of arranging a light-activated element on a circuit board.

In the present invention, the light-emitting element 16 and the light-receiving element 18 may be mounted on the circuit board 20 using an apparatus as shown in FIG. 9. The light-activated element mounting apparatus in FIG. 9 includes a board supporting table 64 having a flat upper surface on which the circuit board 20 is to be mounted. Columnar pins 70 to 72 are mounted on and perpendicularly extend from the upper surface of the board supporting table 64 in the substantially same layout as that of the positioning projections 50 to 52 in the package main body 12. More specifically, the pins 70 to 72 are arranged such that points 50a, 51a, and 52a in FIG. 6 match points 70a, 71a, 72a in FIG. 9, respectively. These points is ones with which the circuit board 20 is brought into contact. Therefore, when the circuit board 20 rests on the board supporting table 64 such that a long side 20a and a short side 20b of the circuit board 20 are brought into contact with the pins 70 to 72, the contact points of the pins 70 to 72 match the contact points of the positioning projections 50 to 52, respectively. Using the contact points as reference points, the light-emitting element 16 and the light-receiving element 18 are arranged on the circuit board 20 at positions determined in advance with respect to the reference points. In this case, upon mounting the circuit board 20 in the package main body 12, the light-emitting element 16 and the light-receiving element 18 are arranged at predetermined positions in the package main body 12 regardless of the shape of the circuit board 20.

When the light-emitting element 16 and the light-receiving element 18 are to be actually mounted on the circuit board 20, first of all, the circuit board is rested on the board supporting table 64. Thereafter, forces as indicated by arrows 74 to 76 are caused to act on the circuit board 20, thereby holding the circuit board 20 on the board supporting table 64. The light-emitting element 16 and the light-receiving element 18 are fixed at predetermined positions using the contact points of the pins 70 to 72 as the reference points. When the light-emitting element 16 and the light-receiving element 18 are to be fixed, a suitable manipulator such as a robot arm having a collet at the distal end thereof is preferably used.

If the dimensional precision of the circuit board 20 is high, the mounting positions of the light-emitting element 16 and the light-receiving element 18 can be easily specified without using the above-described light-activated element mounting apparatus. In this case, bottomed holes (not shown) can be formed at the element mounting positions on the circuit board 20 in advance, and the light-activated elements 16 and 18 can be fitted in the holes, thereby accurately positioning the light-activated elements 16 and 18. A ground electrode or a lead electrode for inputting/ outputting an electrical signal may be provided by metallization or the like on the inner wall and the bottom surface of the bottomed hole. Metallized portions may be formed to be used as the mounting positions of the light-activated elements 16 and 18 without forming the bottomed holes.

The preferred embodiment of the present invention has been described above. The present invention is not limited to this embodiment, as a matter of course. The optical module of the above embodiment is a module used for both transmission and reception, and the light-emitting element 16 and the light-receiving element 18 are arranged on one circuit board 20. However, the present invention can also be applied to an optical module having only one function of transmission or reception.

In the above embodiment, the springs 54 to 56 press the circuit board 20 through the transparent lid 44. However, the springs may directly press the circuit board 20.

Figure 10:
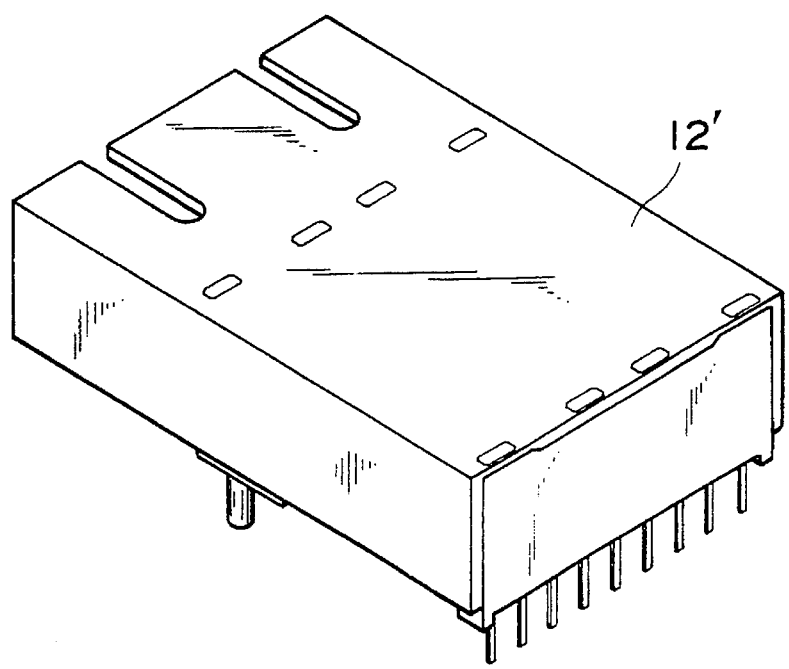
FIG. 10 is a perspective view showing an optical module according to another embodiment of the present invention.
Figure 11:
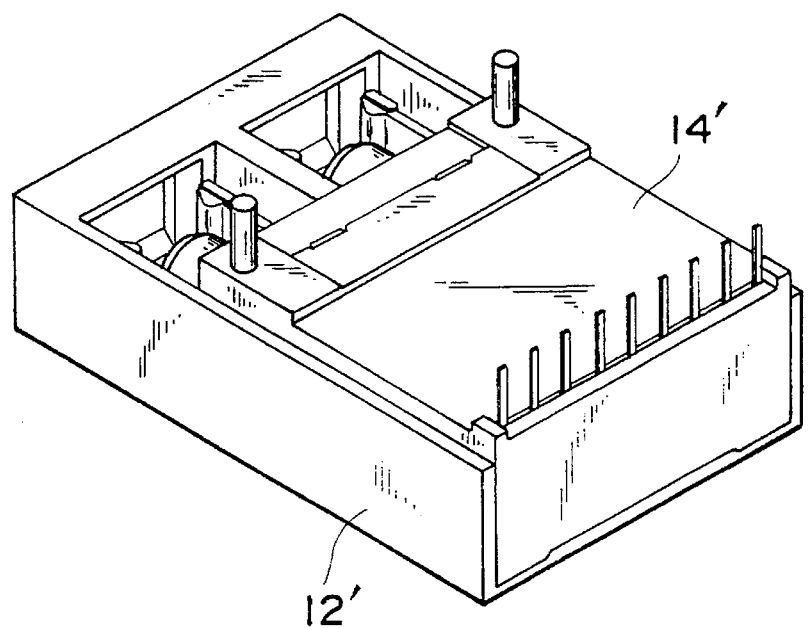
FIG. 11 is a perspective view showing the optical module in FIG. 10, when viewed from a lower surface side.
Figure 12:
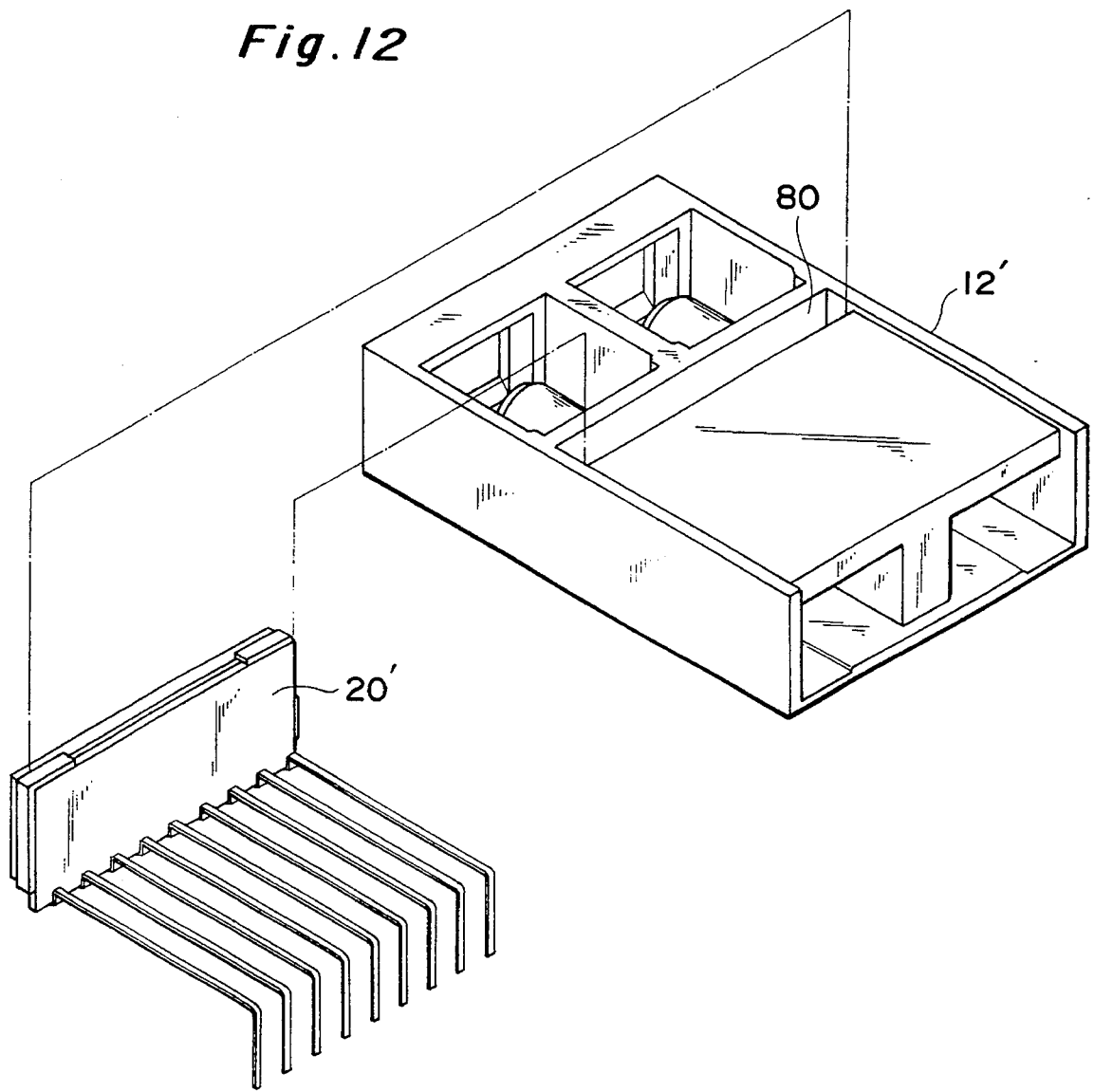
FIG. 12 is a perspective view showing a package main body and a circuit board of the optical module in FIG. 10.
Figure 13:
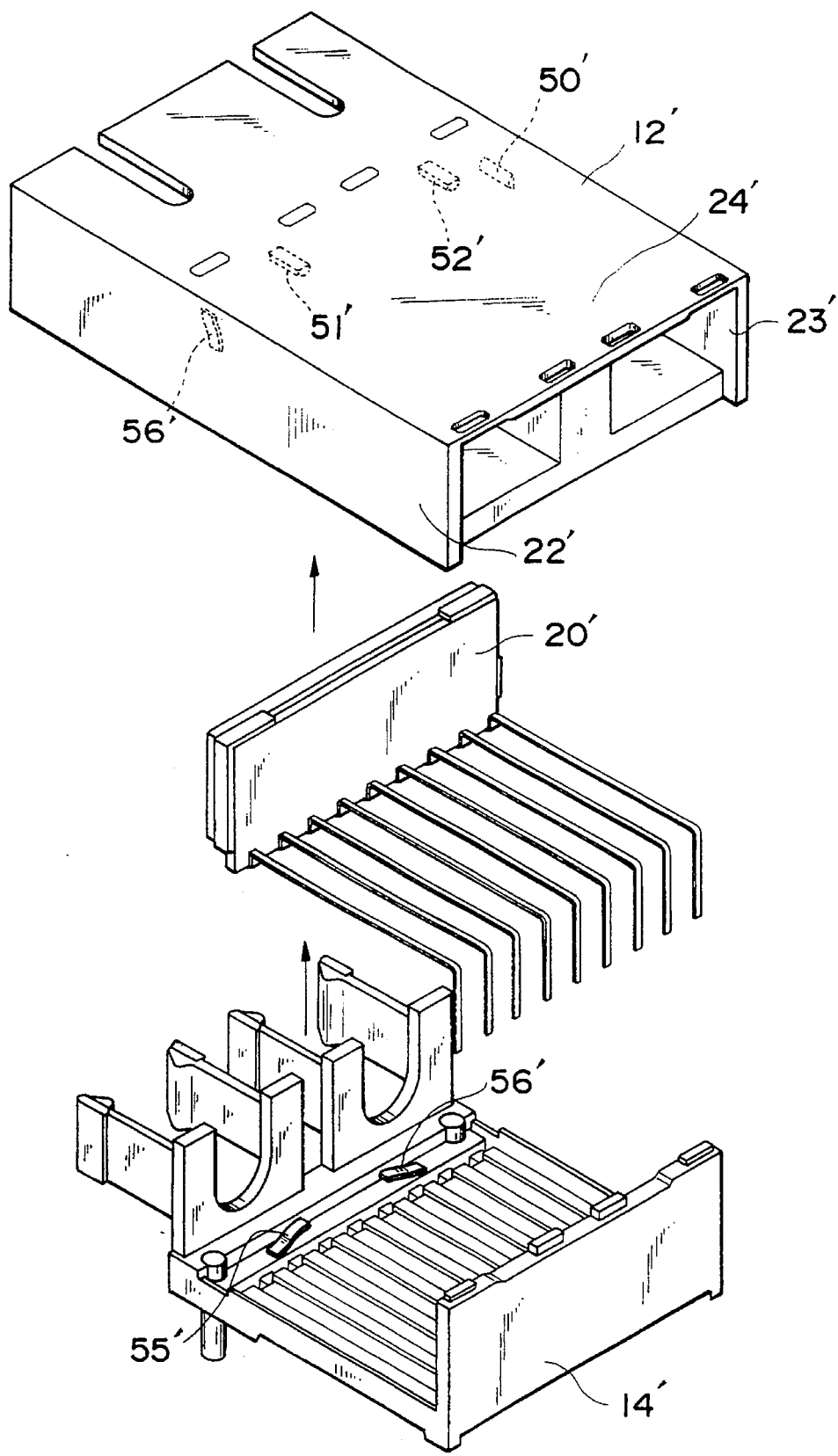
FIG. 13 is a perspective view showing a method of assembling the optical module in FIG. 10.

In the above embodiment, the springs 54 to 56 for pressing the circuit board 20 against the positioning projections 50 to 52 are formed on the package main body 12. However, as in an optical module shown in FIGS. 10 and 11, these springs may be arranged on the remaining members constituting the package. In the optical module in FIGS. 10 and 11, a space portion 80 for arranging a circuit board 20' is formed at the central portion of a package main body 12' (FIG. 12). A cover 14' is mounted from the lower side of the circuit board 20' (FIG. 13). In this arrangement, as shown in FIG. 13, a spring 56' for pressing the circuit board 20' against a positioning projection 50' on a side plate 23' of the package main body 12' is provided on the inner surface of a side plate 22', as in the above embodiment. However, springs 55' and 56' for pressing the circuit board 20' against positioning projections 51' and 52' on the lower surface of the upper plate 24 are provided to the cover 14'. In this case, when the cover is mounted, the circuit board 20' is simultaneously completely pressed against the projections 50' to 52', so the optical module can be more easily manufactured.

As has been described above, according to the present invention, the sleeves and the package main body are integrally formed of a plastic, and the light-activated elements are fixed on the circuit board in advance with this arrangement, the optical module can be assembled in the number of manufacturing steps smaller than that of the prior art. Therefore, the optical module can be provided at lower cost. In addition, the package is formed of a plastic, so mass production can be achieved.

Furthermore, the circuit board is supported at the three points. This arrangement can cope with circuit boards having various shapes and sizes, so that a circuit board can always be supported at predetermined reference points. Therefore, when the light-activated elements are arranged at predetermined positions corresponding to the reference points, the light-activated elements, the sleeves, and the lenses can be coaxially arranged.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

The basic Japanese Application No. 5-245479 filed on Sep. 30, 1993 is hereby incorporated by reference.

What is claimed is:

1. An optical module comprising:
   a plastic package for receiving and holding a connector plug connected to an optical fiber, said package including a package main body and a cover for closing an open portion of said package main body;
   a sleeve formed integrally with said package main body by plastic molding to receive an end portion of said optical fiber when said connector plug is held in said package main body;
   a circuit board held in said open portion of said package main body;
   a light-activated element fixed at a predetermined position of said circuit board;
   three projections formed integrally with an inner surface of said package main body and brought into contact with a periphery of said circuit board to position said circuit board;
   spring means formed integrally with an inner surface of said package to press said periphery of said circuit board against said projections; and
   a condenser lens coaxially arranged in said sleeve.

2. A module according to claim 1, wherein said circuit board is substantially rectangular, one of said projections is in contact with a first side of said circuit board, and remaining two of said projections are in contact with a second side of said circuit board, said second side being adjacent to said first side.

3. A module according to claim 2, wherein said package main body is a box of a substantial rectangular prism shape, said one of said projections is formed on an inner surface of one side plate of said package main body, and said remaining two of said projections are formed on an inner surface of an upper plate of said package main body.

4. A module according to claim 1, wherein said spring means comprises a plurality of springs for pressing said circuit board against said projections.

5. A module according to claim 1, wherein, when said circuit board is substantially rectangular, one of said projections is in contact with a first side of said circuit board, and remaining two of said projections are in contact with a second side of said circuit board, said second side being adjacent to said first side, said spring means comprises a spring formed integrally with an inner surface of the other side plate to press said circuit board against said one of said projections, which is provided on said one side plate, and a spring formed integrally with said inner surfaces of said side plates to press said circuit board against said remaining two of said projections, which are provided on said upper plate.

6. A module according to claim 1, wherein said cover is mounted from a rear surface side of said circuit board arranged in said package main body.

7. A module according to claim 1, wherein said cover is mounted from a lower side of said circuit board arranged in said package main body.

8. A module according to claim 7, wherein, when said circuit board is substantially rectangular, one of said projections is in contact with a first side of said circuit board, and remaining two of said projections are in contact with a second side of said circuit board, said second side being adjacent to said first side, said spring means comprises by a spring formed integrally with an inner surface of the other side plate to press said circuit board against said one of said projections, which is provided on said one side plate, and a spring formed integrally with said cover to press said circuit board against said remaining two of said projections, which are provided on said upper plate.

9. A module according to claim 1, wherein a transparent lid is fixed to said circuit board to cover an electronic circuit and said light-activated element on said circuit board, and said spring means causes a pressing force to act on said circuit board through said transparent lid.

10. A module according to claim 1, wherein said optical module is a transmission module having a light-emitting element as said light-activated element.

11. A module according to claim 1, wherein said optical module is a reception module having a light-receiving element as said light-activated element.

12. A module according to claim 1, wherein said optical module is a transmission/reception module having a light-emitting element and a light-receiving element as said light-activated element.

13. A module according to claim 1, wherein a plurality of grooves are formed in an inner surface of said sleeve to extend in a longitudinal direction and circumferentially spaced to each other.

14. A method of manufacturing an optical module comprising a plastic package for receiving and holding a connector plug connected to an optical fiber, said package including a package main body and a cover for closing an open portion of said package main body, a sleeve formed integrally with said package main body to receive an end portion of said optical fiber when said connector plug is held in said package main body, a circuit board held in said open portion of said package main body, a light-activated element fixed at a predetermined position of said circuit board, three projections formed integrally with an inner surface of said package main body and brought into contact with a periphery of said circuit board to position said circuit board, and spring means formed integrally with an inner surface of said package to press said periphery of said circuit board against said projections, comprising the steps of:

providing a board supporting table having three positioning pins mounted on a surface in substantially the same arrangement as that of said three projections;

resting said circuit board on said surface of said board supporting table;

pressing said circuit board such that said periphery of said circuit board is brought into contact with all said pins;

defining contact points of said pins as reference points; and fixing said light-activated element at position predetermined with respect to said reference points.

15. A method according to claim 14, wherein said circuit board is substantially rectangular, one of said pins is in contact with a first side of said circuit board, and remaining two of said pins are in contact with a second side of said circuit board, said second side being adjacent to said first side.

16. A method according to claim 14, wherein said light-activated element is a light-emitting element.

17. A method according to claim 14, wherein said light-activated element is a light-receiving element.

* * * * *